(No Model.) 2 Sheets—Sheet 1.
E. SCHRABETZ.
Mechanical Pneumatic Brake for Cars.
No. 242,226. Patented May 31, 1881.
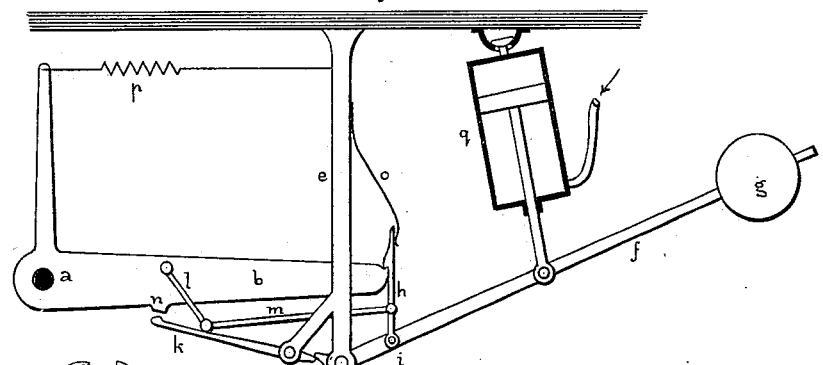
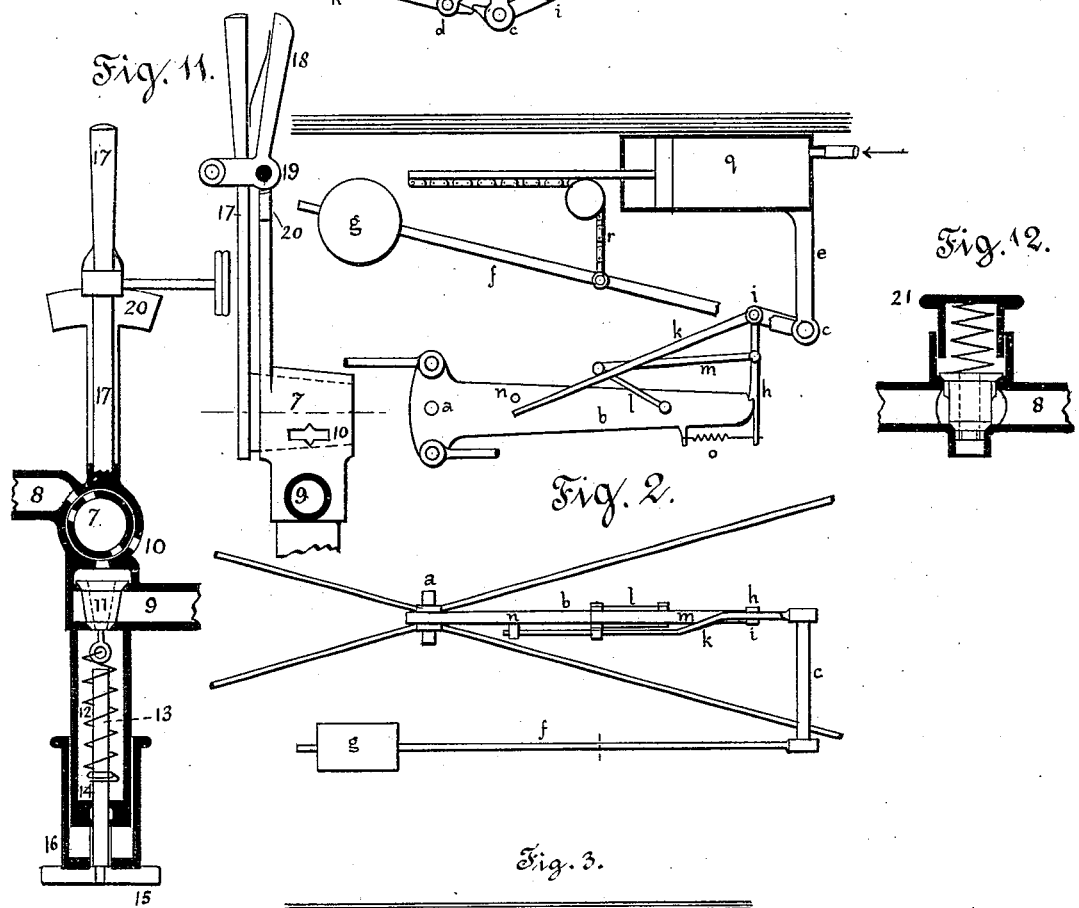
Witnesses:
Willy G. E. Schutt
John C. Tunbridge
Inventor:
Emil Schrabetz
by his attorney,
A. v. Briesen (No Model.) 2 Sheets—Sheet 2.
E. SCHRABETZ.
Mechanical Pneumatic Brake for Cars.
No. 242,226. Patented May 31, 1881.
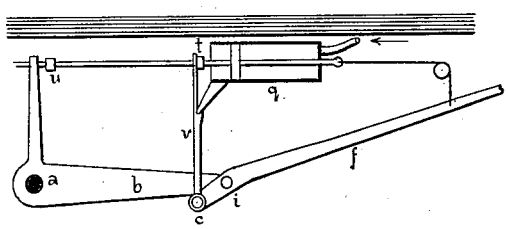
Fig. 4.
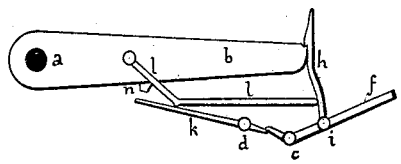
Fig. 6.
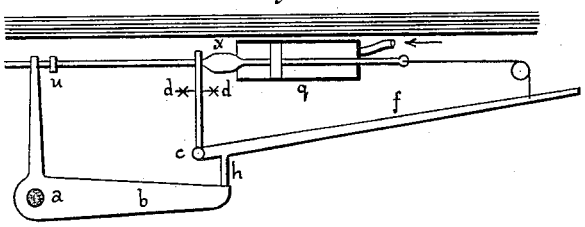
Fig. 5.
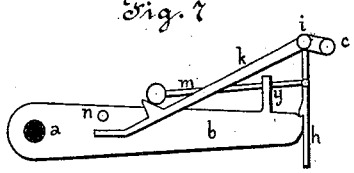
Fig. 7.
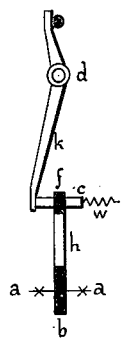
Fig. 5ª.
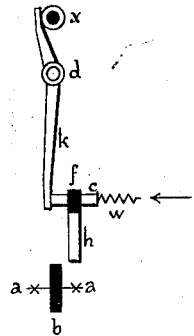
Fig. 5ᵇ.
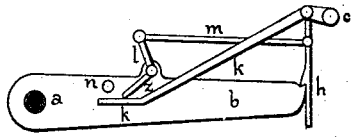
Fig. 8.
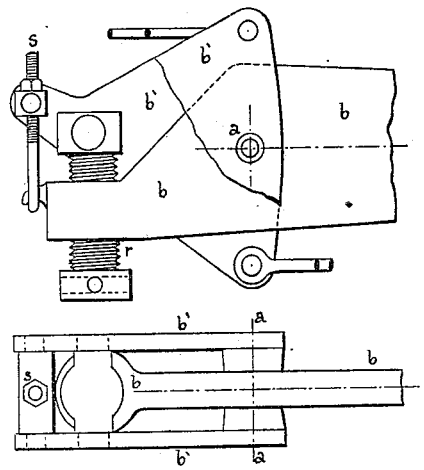
Fig. 9. Fig. 10.
Witnesses: Inventor: Emil Schrabetz
by his attorney,

UNITED STATES PATENT OFFICE.

EMIL SCHRABETZ, OF VIENNA, AUSTRIA.

MECHANICAL PNEUMATIC BRAKE FOR CARS.

SPECIFICATION forming part of Letters Patent No. 242,226, dated May 31, 1881.

Application filed October 18, 1880. (No model.)

*To all whom it may concern:*

Be it known that I, EMIL SCHRABETZ, residing at Vienna, in the Empire of Austria, and a subject of the Emperor of Austria, have invented certain Improvements in Mechanical Pneumatic Brakes for Railway-Carriages, of which the following is a specification.

As an agent for brake-pressure I employ gravity in the form of a weight applied to each carriage. The effect of this weight is counteracted by compressed air, the weight being raised by means of a convenient transmission, (an ordinary cylinder with piston or membrane or packing, nozzle, or bellows,) designated by me "discharging-cylinder." The compressed air is transmitted by means of a conducting-pipe to the discharging-cylinders of the brake-carriages. The effect of the weight may be equally counteracted by any gaseous or aeriform body, the compression or tension being obtained either mechanically or by caloric power, or the chemically-produced gas may receive simultaneously the necessary tension. The said arrangements may be combined, and the same effect is obtained by a vacuum. Liquid bodies may be employed instead of air or gases. The said substances having the same effect, I shall describe below a brake worked by compressed air.

Valves are dispensed with in the conduit-pipes, and distribution-cocks are necessary only at the point from which the mechanism is to be worked. My arrangement differs essentially from other pneumatic brakes, the compressed air being discharged not only from the conduit-pipe, but from all the cylinders, so that the compressed air is never employed, neither directly nor indirectly, for exercising a pressure on the brake-blocks. All arrangements for producing, accumulating, and conducting the compressed air serve a purpose quite different from the purpose of other brakes.

The brake consists of two parts, the mechanical and pneumatic part. In the function of the mechanical part of the brake—that is, in the working of the sinking weight—three gradations are to be distinguished, viz: (A) the rapid movement of the brake-blocks toward the wheels; (B) the production of a mechanical combination of great multiplication of power; (C) the using of this combination for producing a relatively high pressure of the brake. When the brake is to be relieved, the proceeding takes place in an inverted order.

Figures 1 and 2 (longitudinal section under the carriage-frame) show two of the several dispositions of the system in the position B, the combination being established and the brakes applied in order to explain the effect of the system.

$a$ is the brake-shaft fixed on the carriage. $b$ is the brake-lever; $c$ and $d$, revolving axles ($d$ not needed in the arrangement of Fig. 2) fixed on the support $e$, which may also guide the lever $b$. $f$ is the lever of the weight $g$. $h$ is the piece connecting the two levers and turning on the bolt $i$. $k$ is the regulating-lever, which disengages the piece $h$ by means of the links $l\,m$, and by contact at the point $n$ lifts the brake-lever.

The lever $f$ is joined directly to the piston-rod of the discharging-cylinder $q$, Fig. 1, which is pivoted in a socket-joint, or the said lever may be joined to the piston-rod of a fixed cylinder by means of a chain or wire rope, $r$, Fig. 2, passing over a pulley. When the air escapes from the cylinder the action of the weight is transferred by means of the combined levers $b$ and $f$ to the brake-shaft and through it to the brake-blocks. The effect of the weight is partly neutralized when some pressure of air is maintained in the cylinder, so that any desired pressure of the brake may be obtained, limited only by the dimensions of the levers and of the weight. But when full pressure is produced in the cylinder the lever is raised and consequently the regulating-lever $k$ pushes back the piece $h$ by means of the link $l\,m$, thus disengaging the lever $b$. Meanwhile the regulating-lever $k$ has reached the contact-point $n$ of the brake-lever, and, lifting it, removes the brake-blocks from the wheels.

As the weight $g$ follows the vertical vibrations of the carriage the pressure of the brake must continually vary, and consequently the effect be augmented. Springs may be attached to the extremity of the lever $f$ in order to regulate this effect.

The connecting-piece $h$ is continually drawn toward the brake-lever $b$ by the weight of the link $l\,m$, but in order to overcome the eventual jolts the continuous contact of these parts is also insured by the spring $o$. The tendency of the lever $b$ to take the lower position can be assisted by a spring, $p$, Fig. 1.

The shaft $a$, occupying the whole breadth of the carriage, ought to be very strong, because the pressure of the brake may be equal to the weight of the carriage.

The disposition shown in Fig. 2, where the rods are directly fixed on the brake-lever $b$, offers the advantage of the shaft serving as an axle, and may be thinner.

In a combination of levers represented in Fig. 2 the lever $f$ must pass by the axle $a$ and by the brake-rods. For that purpose the said lever $f$ and cylinder $g$ are to be disposed sideward. The axle $c$ becomes a shaft, solidarising the movement of the levers $f$ and $k$.

The dispositions shown in Figs. 1 and 2, demonstrating only the system, admit of several combinations. The lever $f$, Fig. 1, can be arranged above the lever $b$, and the lever $f$, Fig. 2, below the lever $b$. The dispositions of the cylinders may be varied, or a vertical fixed cylinder may be placed vertically, the piston-rod moving the lever $f$. The disposition of the brake-rods shown in Fig. 2 may be applied to Fig. 1. The cylinder in Fig. 1 can be connected with the lever $f$, and the piston-rod may be suspended in the socket-joint, so that the cylinder is utilized also as an acting-weight.

Other similar dispositions are represented in Figs. 3, 4, and 5.

In Fig. 3 the disengaging of $h$ is effected by pressing the collar $t$ of the piston-rod against the regulating-lever $k$. After further advancing of the piston-rod the second collar, $u$, presses against the arm of the lever $b$, thus lifting it, and consequently releasing the brake-blocks. The disposition shown in Fig. 4 differs from the latter, both levers $b$ and $f$ being united in joint $i$, and the pivot $c$ of the lever $f$ not being fixed, but only inserted. The collar $t$ of the piston-rod relieves the support $v$, and afterward the collar $u$ raises the lever $b$ and its appendages.

In Figs. 5, 5$^a$, and 5$^b$, is $c$, a fixed but longitudinally-movable axle, on which the lever $f$ is placed. This axle is pressed by the spring $w$ into the position shown in Fig. 5$^a$, so that the levers $b$ and $f$ are in the same plane. In this case is $k$, the regulating-lever, turning around the axle $d$.

$h$ is the regulating-support, firmly connected with $f$. When the piston-rod moves outward the boss $x$ throws the lever $k$ aside, thus bringing the axle $c$ and the lever $f$ into the position shown in Fig. 5$^b$. The disengagement is now effected, and the collar $u$ can raise the lever $b$.

The axle $c$ may be fixed, and the lever $f$, on which the spring works, may be movable, or the lever $f$ may be fixed and the lever $b$ may move.

The above dispositions of the system admit, as before said, of several combinations.

Figs. 6, 7, and 8 show some arrangements by which the link $l\,m$ may be dispensed with.

In Fig. 6 the regulating-lever $k$ raises the piece $l$, bearing against the piece $h$, which, owing to its form, is thrown aside when $l$ is raised by $k$.

In Fig. 7 the piece $m$ is guided by $y$, and bears on its extremity a pulley. The regulating-lever $k$, furnished with a wedge-shaped boss, throws the piece $h$ aside by means of $m$.

In Fig. 8 the piece $m$ is connected with the crank-lever $l\,z$. The axle of this lever is fixed on $b$. $k$ bears against the crank-lever and throws $h$ aside. These insertions may be applied in different combinations of the levers $b$ and $f$, and in a similar way it may be effected that the piece $h$ does not vibrate in the plane of the levers, but is thrown out sidewise.

In order to augment the multiplication of power, a third lever may be applied to the lever $f$. The disengagement remains between the levers $b$ and $f$.

For the purpose of facilitating the readjustment of the worn brake-blocks, and chiefly for regulating all the brake-blocks from one point, the brake-lever is composed of two pieces. The proper brake-lever moves freely upon the brake-shaft, but a second auxiliary lever is firmly connected with the shaft or directly receives the brake-rods, in which case, also, the latter lever may move freely upon the shaft. Both levers are so connected that an angular motion between them is possible. In constructing this disposition it will be convenient to double one of the levers. Figs. 9 and 10 show such applications when the brake-rods are directly fixed on the auxiliary lever; but when the said rods are not fixed on the auxiliary lever $b'$ (here doubled) they are firmly fixed on the shaft furnished at its extremities with the usual contrivances for receiving the brake-rods.

$a$ is the brake-axle; $b$, the brake-lever; $b'$, the auxiliary lever. The movable connection of $b$ and $b'$ is effected by the set-screws $r$ and $s$, Fig. 9, and $s$, Fig. 10.

When horizontal discharging-cylinders with pistons are used the piston may be turned from time to time, in order to obtain its uniform wearing and greasing.

It is evident that the brake can be worked also by hand. The lever $f$ or the piston-rod is then to be connected by suitable means with the post of the brakeman, but without hindering the movement of the piston.

A spring may be inserted in the transmission in order to obtain a partial effect of the weight $g$. In some cases the cylinder $q$ may be omitted, and the mechanical part of the system be separately employed as a hand-brake.

The compressed air necessary for releasing the brakes is collected in a reservoir by an air-pump.

The mechanism for setting the brakes in motion, Fig. 11, is situated between the reservoir and the main conduit. It consists of a cock, 7, connecting the main conduit 8 either with the reservoir-conduit 9 or with the atmosphere at 10. The openings of the cock have the shape shown at 10, (side view,) allowing very small passages.

11 is a double-seat valve, of such dimensions that, being regulated by the spring 12, automatically allows the air to pass from 9 to 8, when the pressure in 8 sinks below a certain proportion to 9, where a greater pressure of the reservoir takes place. The tube inclosing the spring 12 has a thread on its outside, and the cap 16 on the inside, (not shown in Fig. 14,) so that the tension of the spring is regulated by turning the socket, the spring being attached to the spindle 13, and the bar 15 of the spindle rests in an excavation of the cap. The pressure in 9 is limited by a safety disposition, or the working of the air-pump is regulated by the pressure in the reservoir. The space 14 communicates with 8 through the hollow valve 11. The pressure in 9 might be much reduced in consequence of an extraordinary consumption of air, and it might be needful to open the valve 11, which works only to a certain degree of pressure. In this case the spindle 13 can cause the lifting of the valve 11 by turning the bar 15 ninety degrees. In this position the said bar or head falls into two longitudinal slots of 16, so that the spindle can be pressed upward.

The lever 17, which turns the cock 7, bears the handle 18 with the worm 19, which catches in the fixed toothed segment 20. The turning of the worm only causes a small movement of the arc 7, and a rapid movement of 17 is possible after the disengaging the worm by means of the handle.

The conduit-pipe 8 contains a safety-valve, Fig. 12, which ejects the air when a certain pressure is effected. The valve is regulated by the hood 21 and spring. The hood 21 is screwed in the body of the valve. (Not shown in Fig. 12.)

The air-pressure existing in the conduits 8 and 9 is indicated by two monometers.

Having thus described my invention, what I claim as new, and desire to secure by Letters Patent, is—

1. In a car-brake, the combination of the cylinder $q$ and its piston with the weighted lever $f$, lever $k$, links $l$ $m$, catch $h$, and brake-lever $b$, substantially as herein shown and described.

2. The combination of the cylinder $q$ and its piston with the weighted lever $f$, catch $h$, lever $k$, and brake-lever $b$, substantially as herein shown and described.

3. The combination of the cylinder $q$ and its piston and piston-rod with the weighted lever $f$, brake-lever $b$, and with a locking-catch, substantially as herein shown and described.

4. The combination of the brake-lever $b$ with the weighted lever $f$ and with connecting mechanism, and with means for moving the lever $f$, and thereby the lever $b$, substantially as herein shown and described.

5. The brake-lever $b$, composed of two adjustable levers, $b$ $b'$, combined with the screw $s$, for the regulation of the position of the brake-blocks, substantially as represented.

In testimony whereof I have signed my name to this specification in the presence of two subscribing witnesses.

EMIL SCHRABETZ.

Witnesses:
   EDWD. C. V. RUTY,
   JOHANN BARTA.